United States Patent
Klein et al.

(10) Patent No.: US 11,531,788 B2
(45) Date of Patent: Dec. 20, 2022

(54) METHOD FOR OPERATING A TOUCH-SENSITIVE, PLANAR INPUT DEVICE OF A COMPLETE DEVICE, AND COMPLETE DEVICE

(71) Applicant: AUDI AG, Ingolstadt (DE)

(72) Inventors: Markus Klein, Pförring (DE); Kamil Zawadzki, Munich (DE); Changsup Ahn, Ingolstadt (DE); Tim Krämer, Eitensheim (DE); Mathias Bösl, Ingolstadt (DE)

(73) Assignee: Audi AG, Ingolstadt (DE)

( * ) Notice: Subject to any disclaimer, the term of this patent is extended or adjusted under 35 U.S.C. 154(b) by 52 days.

(21) Appl. No.: 16/768,137

(22) PCT Filed: Apr. 18, 2019

(86) PCT No.: PCT/EP2019/060133
§ 371 (c)(1),
(2) Date: May 29, 2020

(87) PCT Pub. No.: WO2019/206815
PCT Pub. Date: Oct. 31, 2019

(65) Prior Publication Data
US 2021/0073424 A1 Mar. 11, 2021

(30) Foreign Application Priority Data
Apr. 27, 2018 (DE) .................... 10 2018 206 541.1

(51) Int. Cl.
*G06F 21/85* (2013.01)
*G06F 3/0354* (2013.01)
(Continued)

(52) U.S. Cl.
CPC .......... *G06F 21/85* (2013.01); *G06F 3/03547* (2013.01); *G06F 3/0416* (2013.01);
(Continued)

(58) Field of Classification Search
CPC .... G06F 21/85; G06F 3/03547; G06F 3/0416; G06F 21/445; G06F 21/71; G06F 3/041;
(Continued)

(56) References Cited

U.S. PATENT DOCUMENTS

2011/0137490 A1 6/2011 Bosch et al.
2012/0001876 A1 1/2012 Chervenka et al.
(Continued)

FOREIGN PATENT DOCUMENTS

DE 102009056786 A1 6/2011
DE 102017212809 B3 9/2018
EP 2775421 A1 9/2014

OTHER PUBLICATIONS

International Preliminary Report on Patentability directed to related International Patent Application No. PCT/EP2019/060133, completed Mar. 26, 2020, with attached English-language translation; 12 pages.

(Continued)

*Primary Examiner* — Mohammad W Reza
(74) *Attorney, Agent, or Firm* — Sterne, Kessler, Goldstein & Fox P.L.L.C.

(57) ABSTRACT

An approach for operating at least one touch-sensitive, flat input device of a complete device, the input device being connected via a message-based bus connection to a control device of the complete device, and messages containing touch datasets describing touch data events being transmitted to the control device, which evaluates the messages for input information for an application program implemented by the control device, wherein when a security function in the control device that queries sensitive input information is accessed, the touch datasets are transmitted from the input device to the control apparatus via the bus connection in encrypted form until the associated input process has ended.

20 Claims, 4 Drawing Sheets

(51) Int. Cl.
*G06F 3/041* (2006.01)
*H04L 9/32* (2006.01)

(52) U.S. Cl.
CPC .......... *H04L 9/3242* (2013.01); *H04L 9/3271* (2013.01); *H04L 2209/84* (2013.01)

(58) Field of Classification Search
CPC .. H04L 9/3242; H04L 9/3271; H04L 2209/84
See application file for complete search history.

(56) References Cited

U.S. PATENT DOCUMENTS

| | | | |
|---|---|---|---|
| 2012/0265980 A1* | 10/2012 | Moon | G06F 21/6272 713/150 |
| 2012/0303964 A1 | 11/2012 | Kim | |
| 2013/0040620 A1 | 2/2013 | Van Wiemeersch et al. | |
| 2013/0121487 A1* | 5/2013 | Lorberbaum | H04N 21/23476 380/44 |
| 2014/0237576 A1* | 8/2014 | Zhang | G06F 21/32 726/7 |
| 2015/0095241 A1 | 4/2015 | Edwards | |
| 2016/0182501 A1 | 6/2016 | Woodward et al. | |
| 2017/0032573 A1* | 2/2017 | Dow | G06F 21/606 |

OTHER PUBLICATIONS

International Search Report and Written Opinion of the International Searching Authority directed to related International Patent Application No. PCT/EP2019/060133, dated Jul. 11, 2019, with attached English-language translation; 18 pages.

Schneier, Bruce, "Applied Cryptography, Second Edition, Protocols, Algorithms, and Source Code in C," John Wiley & Sons, Inc., Indianapolis, IN, 1996; 58 pages.

\* cited by examiner

METHOD FOR OPERATING A TOUCH-SENSITIVE, PLANAR INPUT DEVICE OF A COMPLETE DEVICE, AND COMPLETE DEVICE

TECHNICAL FIELD

The disclosure relates to a method for operating at least one touch-sensitive, flat input device of a complete device, the input device being connected via a message-based bus connection to a control device of the complete device, and messages containing touch datasets describing touch data events being transmitted to the control device, which evaluates the messages for input information for an application program implemented by means of the control device. In addition, the disclosure relates to a complete device.

BACKGROUND

Complete devices, in particular motor vehicles, are characterized by an ever increasing number of electronic components, which in particular also allow interaction with a user, for example a driver of the motor vehicle, for controlling the complete device and/or with regard to other functions, for example infotainment. Touch input devices, that is to say touch-sensitive, flat input devices, such as touchpads or touchscreens, are among the particularly popular input devices for such complete devices. A suitable sensor system of such an input device determines in particular the coordinates of a touch, in particular by a finger, and compiles a bus message which is forwarded to a control device of the complete device or a component thereof, for example a control unit, via a corresponding message-based bus connection, for example a CAN (Controller Area Network) bus. The touch events described in this way are evaluated by the control device in order to determine input information which, for example, can influence the further execution of an application program. In this context, touch screens are particularly advantageous, via which the input can take place particularly intuitively and in particular in the context shown. Moreover, it is also proposed to accept handwritten inputs by such input devices, in which case the control device has a suitable evaluation algorithm in order, for example, to be able to evaluate coordinate data sets describing touch events for the input information.

A large number of system topologies in which such touch input devices are used have become known, in particular in motor vehicles as complete devices. For example, several such input devices and/or further components of the complete device can be connected to the message-based bus connection; in addition to the message-based bus connection, a video connection can also be present, in particular when configured as a touchscreen, via which video data can be streamed to the touchscreen for display.

In at least some of such complete devices, in particular motor vehicles, legal regulations provide that input devices and/or display devices should also be addressable, at least in part, by retrofit devices or the like from other manufacturers. Such retrofitting or conversion processes are also referred to as "aftermarket," so that a corresponding device that also accesses the bus connection (and possibly a video connection) can be referred to as an aftermarket device. The aftermarket device can then also request inputs and can correspondingly receive and evaluate messages containing the touch datasets. Here, however, the problem arises of protecting sensitive data that is to be entered via the input device, and therefore sensitive input information. If, for example, the control device on the complete device asks for such sensitive input information, for example PINs, credit card numbers, passwords or the like, the touch datasets on the bus connection that result from the user interacting with the input device can also be read and interpreted by an appropriately interposed or coupled aftermarket device, so that the security of such input information would no longer be ensured. On the other hand, permanent security would also not be possible, since the aftermarket device would then no longer be able to use the touch input device at all. It should be noted that touch input devices usually have no or only very little intelligence. This means that touch input devices do not usually interpret the touch events themselves, but merely send them, in particular as coordinates in a touch dataset, to the corresponding downstream device that requested the input information, for example the control device or the aftermarket device.

DETAILED DESCRIPTION

The object of the present disclosure is to specify a possibility for securing sensitive data despite the usability of a touch input device for aftermarket devices.

To achieve this object, when a security function querying sensitive input information is accessed in the control device, the touch datasets can be transmitted in encrypted form via the bus connection from the input device to the control device until the associated input process has been completed.

Security functions can expediently be marked as such in the control device, and corresponding sensitive input information can include, for example, PINs, credit card numbers, passwords and the like. In some embodiments, only partial encryption is used whenever a corresponding security function is accessed within the control device. An encryption mode of the input device can then be activated in a targeted manner, in particular by a corresponding message, which lasts as long as the touch events describe the sensitive data, and consequently the sensitive input information. The system then switches back to an unencrypted mode. In this way, an aftermarket device, the interposition of which along the bus connection is expediently also possible within the scope of the present disclosure, can easily use the input device which basically gives the touch datasets, unencrypted, to the bus connection since these datasets have been temporarily encrypted only for sensitive data and for corresponding queries in the control device. In this way, it is not possible for an aftermarket device that does not originate from the manufacturer of the complete device to read off touch datasets describing sensitive input information and even to evaluate them to determine the sensitive input information. There is thus both increased security with regard to sensitive input information and also the use of the input device by aftermarket devices.

Typical applications for using a touch input device for entering sensitive data are, for example, the entry of a credit card number, either by hand or when a keyboard is displayed. The input device, in particular a touchscreen, or an associated display device, which is also designed as a display device, displays what has been entered so far, while the user can write the next numbers on the input device, which in turn are displayed as soon as they have been interpreted and recognized by the control device. A corresponding procedure can be followed when displaying a virtual numeric keyboard, the control device then knowing which coordinates correspond to which number.

A touchpad and/or a touchscreen can specifically be used as the input device. While the use of touchscreens is preferred due to the possibility of displaying input aids, the use of touchpads, in particular for handwritten input, is also expediently conceivable. In general, as already explained, the touch events can describe a handwritten entry.

In some embodiments, the touch datasets can each contain touch coordinates for a finger. This means that, in a correspondingly known manner, each touch dataset contains encoded coordinates which indicate at which position of the input device a finger has touched the touch-sensitive surface of the input device. For example, it is conceivable that a structure is specified for this, which basically results in a certain data size, for example 4 bytes. It should be noted that so-called multitouch-capable touch input devices, in which multiple touch events can occur spatially separated but simultaneously, can be provided to generate a touch dataset for each individual touch event, and therefore each individual finger. In this context, when transmitting via the bus connection, provision can be made either to send a plurality of touch datasets in a message of a predetermined size or to use options provided by the protocol used to enlarge a message. For example, the CAN bus has the option of expanding messages by 8-byte blocks each by means of segmentation.

As already indicated, a CAN connection or a CAN FD (flexible data-rate) connection can preferably be used as the bus connection. The use of a CAN FD connection is particularly useful here, since larger messages are possible which can be used within a certain period of time, for example messages of a size of up to 64 bytes every 10 ms. If a touch dataset has a size of 4 bytes, a large number of touch datasets can therefore be sent within a single message. Storage space in such a message can also be used for further information, which will be explained in more detail below.

Other communication channels can also be used as a bus connection, for example Ethernet or a communication channel which is integrated in a video connection to the input device.

The complete device can preferably be a motor vehicle. In motor vehicles, there is usually equipment specified by the manufacturer with a large number of different input devices, display devices, other output device, for example acoustic output device, and the like, which may also include one or more touch input devices. On the one hand, it is expected in motor vehicles not to be able to use aftermarket devices originating from the manufacturer of the motor vehicle. On the other hand, a high protection standard for sensitive data can be applied. The present disclosure can therefore be used with particular advantage here.

It should be pointed out at this point that the bus connection does not have to be provided exclusively for connecting the input device and the control device, but can also communicate with other components of the complete device via the bus system. The control device can be, for example, a control device, in particular an infotainment control device.

As already mentioned, previous input devices are rather equipped with little "intrinsic intelligence" and thus only provide the touch datasets as messages via the bus connection. The reason for this is that the touch input devices should be kept as inexpensive and as little complicated as possible. To change this fact as little as possible is one of the objects of the following configurations. Another important point to be considered in a specific design is that delays in control communication should be avoided as far as possible in order to avoid a bad user experience. Especially in the case of handwritten input, however, a large number of messages must be transmitted and, in the case of encryption, must also be encrypted. For example, in the case of a CAN bus connection, a message can be sent every ten milliseconds, with a higher prioritization of other messages on the CAN bus which may slow down the delivery. These messages also have an imitated data capacity, and fragmentation of data should also be avoided, since this could result in significant delays. However, delays also should not result from the calculation of the encryption, since touch datasets could then only be sent later. In this context there is also the desire to be able to switch between the encryption mode and the unencrypted mode as quickly as possible, in particular seamlessly, in order to be able to avoid delays and the like here and to be able to offer the input as quickly as possible.

Requirements can be derived from this, on the one hand, that the encryption itself should take place at least approximately without a calculation delay, and therefore in real time. Furthermore, the overhead resulting from the encryption must be minimized and ideally sent over the bus connection if there are no restrictions in terms of time or bandwidth. These lines of thought are the basis of most of the specific embodiments described in more detail below.

To switch over to encrypted touch datasets and to switch back to non-encrypted touch datasets, a switchover message can expediently be transmitted from the control device to the input device as a function of functional information of the application program. This means that the decision as to when to encrypt is made by the control device and is transmitted to the input device via a corresponding switchover message via the bus connection. This preferably changes in a simple switchover process, which can be implemented with little effort, from sending messages with unencrypted touch datasets to sending messages with encrypted touch datasets. In order to secure this communication, the switchover messages are encrypted and/or transmitted with mutual authentication and/or different switchover messages are used for both switchover directions. In this way, an increased security against attacks, for example starting from an aftermarket device, is achieved which attempts to switch back to the unencrypted mode or the like. In this context, it is particularly advantageous to use different switchover messages for the two switching directions. The input device can also expediently transmit a confirmation message when the switchover has taken place via the bus connection to the control device, so that it is made known to the device in particular that encrypted touch datasets are to be expected from now on. However, such a confirmation message can also be omitted if it is otherwise recognizable to the control device that encryption is now present. A confirmation message can nonetheless be useful, in particular if there is an authentication process, for example a signature is to be transmitted back to the control device, for which purpose such a confirmation message can be used.

In some embodiments, messages containing encrypted touch datasets are identified by a set encryption bit and/or a different message type is used for sending messages containing encrypted touch datasets than for sending messages containing unencrypted touch datasets. In this way, the control device can immediately see from the messages whether encrypted touch datasets have been transmitted in them via the bus connection. It is particularly preferred if different message types are used for encrypted touch datasets and non-encrypted touch datasets, where no additional encryption bit has to be used within the message because a differentiation already exists due to the different message types. For example, when using a CAN bus as the bus connection, different CAN identifiers can be used for unencrypted and encrypted touch datasets.

In some embodiments, an encryption data element used for the encryption on the input device side, whose assigned decryption data element to be used for decryption is determined on the basis of shared basic information in the control device, is pre-calculated in the input device and held until it is used for encryption. Therefore, the idea of this approach is, in order to be able to carry out the actual encryption as quickly as possible, with the least possible computing power and as simply as possible, to calculate the corresponding information, i.e. the encryption data element, already at a time when the corresponding encryption data element is not yet required for encryption, so that computing power can be saved within the input device and yet an effective, fast encryption is made possible. Instead, the input device has a storage device in which the encryption data element can be kept until it is actually needed for encryption.

As is generally noted here, encryption data elements and decryption data elements (for decryption) are determined on the basis of shared basic information that is available to both the input device and also the control device, for example on the basis of a key pair or a nonce, which will be discussed in more detail below.

Furthermore, it should be noted that the pre-calculation of the encryption data elements can take place at least temporarily parallel to the encryption or generally within the encryption mode, since an advantage has already been gained in that at least the encryption data element which is required for the current touch dataset to be encrypted is already pre-calculated and there are no additional delays that can lead to undesirable effects.

In some embodiments, the encryption, in particular also the decryption, of the touch datasets takes place by a linking operation, in particular an XOR operation, which can be carried out in real time and/or which maintains the size of the touch dataset. Since the essential part of the encryption work, i.e. the calculation of the encryption data element, has already been completed before the necessary encryption of a touch dataset to be encrypted, for a touch dataset currently to be sent, only the linking operation that registers the encryption data element on the touch dataset or links the encryption data element to the touch dataset is still to be performed, which can be kept simple for different encryption methods. In particular, an XOR operation usually used for key streams is suitable as a linking operation, since this can be implemented by a simple component or electronic component that is easy to implement and does not require any significant time. For example, the linking operation can be implemented by a corresponding circuit component of a circuit board of a control unit of the input device. In this context, it is also particularly expedient if the size of the touch dataset is retained during the encryption, so that no additional overhead arises due to the encryption. For example, both an unencrypted touch dataset and an encrypted touch dataset can be 4 bytes in size. This condition is also fulfilled by an XOR operation as a linking operation. The decryption is preferably also carried out in real time by the control device, and corresponding functional units or components, in particular at least partially implemented as hardware, can also be present there.

In some embodiments, a new encryption data element is used for each touch dataset, with a plurality of encryption data elements being pre-calculated as a pre-calculation set of encryption data elements, in particular as a key stream. A further increase in security is achieved by changing the encryption data element from touch dataset to touch dataset. The so-called stream cipher can be used with particular advantage in the context of the present disclosure. In the case of stream cipher encryption, a certain number of encryption data elements, a so-called key stream, is pre-calculated, going through the encryption data elements one after the other.

It should be noted that both the input device and the control device must be able to maintain the order of the touch datasets in a meaningful manner in order to allow the control device to correctly assign the decryption data elements. This means that, for example, in the case of a synchronization by synchronization signals which is still to be discussed, correct contact datasets must be divided up into messages so that they arrive in the correct order with respect to the synchronization signal. As far as the control device is concerned, the times of arrival must be correctly assigned. Further methods of synchronization in terms of enabling the correct assignment of decryption data elements to touch datasets, for example the use of counters, will be discussed in more detail below.

With regard to the number of encryption data elements present in a pre-calculation set, and consequently the length of the key stream, there is an adaptation parameter by means of which a suitable design of a control unit to be provided on the input device side can be achieved for the corresponding application. If larger pre-calculation sets with more encryption data elements can be used, especially at the encryption time, a lower computing capacity has to be provided, but a larger storage capacity of a storage device of the control unit is required. On the other hand, with smaller pre-calculation sets, for example shorter key streams, less storage space but more computing power is required, since encryption data elements may have to be recalculated in the encryption mode. Ultimately, the choice of the number of encryption data elements to be pre-calculated can be used to balance the memory requirement and computing power.

At least one counter can expediently be used to assign a decryption data element to an encrypted touch dataset, the counter being guided both on the input device side and on the control device side and/or being transmitted from the input device to the control device via the bus connection as part of a message also containing at least one encrypted touch dataset. In other words, the control device must know which encryption data element was used in order to decrypt a touch dataset to be decrypted using the appropriate decryption data element. If the order of the touch datasets is maintained and each message reaches the control device directly, it is sufficient to count the touch datasets on both sides. A more robust configuration results, however, if the counter reading is transmitted from the input device to the control device as part of a message which also contains at least one encrypted touch dataset. However, this configuration is only meaningfully possible if sufficient space is made available within the messages, as is the case, for example, when using the CAN FD bus. The counter can also be cyclic, which means that it can have a predetermined, limited range of values, for example from 0 to 15 for a 4-bit counter or from 0 to 255 for an 8-bit counter. Ultimately, this also determines how much storage space or message portion is required for the counter. Such a counter, which begins again cyclically after the maximum value with the start value, can also form the basis for a hierarchical counter structure or synchronization if, for example, a synchronization signal is output after each "reset" of the counter. A hierarchy of counters provided in this way can also be based on the number of encryption data elements in the pre-calculation set.

As already mentioned, a synchronization message can be transmitted from the input device to the control device in order to synchronize at least one counter with at least one counter reading. Such a synchronization message can, for example, always be sent over the bus connection when a counter that repeatedly runs through a range of values is reset, that is to say it is reset to the first value. In this way, there is always a synchronization period, at least for sets of touch data sets of the same size. The system can quickly synchronize again and the user can immediately repeat any entries that may have been lost.

In some embodiments, a counter is used which starts with a counter reading known on both sides and different from zero. In this way, a further increase in security can be achieved, since further information unknown to a possible eavesdropper is included, such a counter reading (in particular also the starting counter reading) can also be used as time information in other security mechanisms, for example in the pre-calculation of the encryption data elements and/or if authentication methods are used, if a signature is to be generated on the input device side. The current counter reading or the starting counter reading can then be entered here.

It should be noted with regard to the synchronization that both the input device must be able to allow a corresponding assignment of touch datasets before and after a synchronization message, and also the control device must be able to maintain this sequence correctly, in particular in the event of buffering.

In order to achieve further protection against the loss of messages, if the decryption fails, the control device tries again to decrypt at least one future counter reading of the at least one counter. In order to avoid the risk of lost messages and an associated data loss due to decryption that is no longer possible due to loss of synchronization, the control device can also attempt to decrypt future counter readings, which may also be useful with regard to a higher counter hierarchy (for example if a synchronization message is lost). In this way, the robustness of the message loss process is further increased.

In some embodiments, the encryption of the touch datasets takes place using a predetermined asymmetrical or symmetrical key pair, which is stored in the input device and in the control device, and/or a session key negotiated for an encryption phase or an activity period, which in particular is determined depending on the key pair. It is particularly advantageous if a key which forms a key pair that is specific to the entire device is stored in a particularly unchangeable and/or secure manner in the input device and the control device. A symmetrical encryption with identical keys of the key pair is preferred. Methods for storing such a key in the most tamper-proof way possible have already been proposed in the prior art and can also be used in the context of the present disclosure.

Alternatively or additionally, a session key can also be negotiated between the input device and the control device. It is particularly preferred if the session key is determined as a function of the key of the permanently stored key pair. In some embodiments, in an initialization phase the control device transmits session information, in particular a nonce, to the input device. Both the input device and the control device are now able, for example, to specifically determine the pre-calculation set, for example as a function of the respective key of the key pair and/or the session information, and the session information in other exemplary embodiments can also be used only for an authentication process to generate a signature, for example an HMAC (keyed-hash message authentication code), for the input device. It should be noted that, for example, a nonce transmitted as session information can also itself form the session key. In addition, it should be noted that counter readings can also be included in the generation, in particular pre-calculation, of encryption data elements and/or signatures in order to further increase security.

It is also pointed out that, due to the simplest possible design of the input device with rather little intrinsic intelligence, the control device will usually generate the session information, in particular the nonce, since this is not possible or at least not provided by the input device. However, configurations are also conceivable in which session information is generated on both sides. The control device then sends, for example in an initialization message, session information generated by the control device, in particular a nonce, and the input device generates its own session information in response, possibly as a function of the session information on the control device side, which is sent to the control device via a response message, so that the session information is available on both sides. If the session information on the input device side should not or cannot be a nonce, a monotone counter is preferably provided, of which the reading forms the session information and which can be implemented without complexity.

As already mentioned by way of example, at least part of the message exchange between the input device and the control device can take place using an authentication method, in particular on the basis of shared basic information. As already described, the shared basic information (shared information) can in turn include, for example, the key pair, a session key, a start counter reading and the like. In particular, it is specifically conceivable to generate an HMAC as a signature on the part of the input device, which is then transmitted back in at least one further message from the input device to the control device, so that the input device is authenticated to the control device.

In particular in the case of larger signatures and/or if the fewest possible status messages from the input device to the control device are to be used, for example, no confirmation messages to switchover messages and/or confirmation messages to obtain session information are to be used, a signature created by the input device is at least partially transmitted in messages that also contain encrypted touch datasets. This means that the signature can be divided into several such messages, that is, segmented, since, in order to avoid delays as explained at the beginning, the entire signature may not be able to be transmitted, at least not without being able to send a touch dataset in a later time window. It should be noted that input devices which only generate touch datasets and send them in messages when a touch event has actually taken place are also known and are common. Then it can happen that not enough touch events occur within a time interval to transmit the complete signature. Blank messages, which therefore do not contain any encrypted touch datasets, are used to complete the transmission of the signature.

In other configurations, it makes sense to transmit signatures created by the input device, for example as part of confirmation messages (for example to a switchover message), synchronization messages or the like. The latter is particularly useful if the signature updated with a counter reading is encrypted.

With regard to the pre-calculation, before the security function is actually accessed, a pre-calculation dataset is generated which is then used for the next encryption time period. For this purpose, the control device can transmit a message containing, for example, session information such as a nonce, to the input device which, for example, pre-calculates the pre-calculation set, in particular a key stream, and transmits a corresponding confirmation ("nonce ready") back to the control device as a confirmation message. If the security function is then accessed later, the encryption data elements are already available and fast encryption, which can be carried out in real time in particular, can be achieved by means of a linking operation.

In some embodiments, when an error is detected in the context of the encryption by the control device, a warning is output via at least one output device that is independent of the input device, and in particular cannot be addressed by an aftermarket device. Errors can be, for example, an unsuccessful authentication, an encryption that is not activated or deactivated too early, an unsuccessful decryption and the like. In particular in a motor vehicle as a complete device, there are many different ways of issuing a warning to a user. For example, a (possibly further) display device can be used, in the instrument panel and/or a head-up display, which usually cannot be controlled by an aftermarket device. Output device for audio are also usually not used by aftermarket devices, so that a warning can be generated in this way. Other measures in the event of a fault can also include a functional restriction of another part of the complete device, for example the motor vehicle, if there are serious threats to the complete device. Finally, in response to an error, it is also conceivable to switch the input device, which is also designed as a display device, or an associated display device to black.

Incidentally, this error query can also be expanded beyond the encryption or authentication via the bus connection, since, for example, authentication can also be provided for a video connection that may be additionally provided and may fail. Errors to be taken into account can also come from an IDS (intrusion detection system).

In the case of an input device also designed as a display device and/or a display device assigned to the input device, a mutual authentication of the control device and the display device, specifically the displayed contents, can take place via a video connection provided in addition to the bus connection, in order also to increase security here. A corresponding authentication method for a video connection, which is also suitable in the context of the present disclosure, was proposed, for example, in the subsequently published German patent application DE 10 2017 212 809.7.

In some embodiments, in the case of an input device also embodied as a display device and/or a display device assigned to the input device, an input note for the sensitive input information is only displayed when encryption is activated. Since the switching to the encryption mode on the part of the input device can take a certain time due to delays along the electronics of the control device, the bus connection and/or the input device itself, the user is also expediently not prompted by a premature display of the input note to enter sensitive information while the touch datasets are still being transmitted unencrypted via the bus connection. A further increase in security is achieved in this way. The activation of the encryption mode on the part of the input device can be determined particularly preferably by receiving a corresponding confirmation message to a switchover message. It should be pointed out that other conditions are also conceivable to enable the display of the input instruction for the sensitive input information. For example, it can be requested as an additional condition that authentication has taken place via the video connection.

In some embodiments, the input device always starts in non-encrypted mode when restarting. This means that the encryption mode is not maintained after a reset. The input device (and possibly also the control device) always starts in unencrypted mode. In this way, the usability is finally ensured by an aftermarket device and a way out is offered if the input device and the control device are in different modes.

Resetting to the same, unencrypted mode can also be ensured if the other communication partner in each case is reset when the input device and/or the control device is reset, in particular via an authenticated message. Authentication for the corresponding message is extremely important in order to avoid resets that are triggered, for example, by an aftermarket device. The corresponding reset message can contain, for example, a randomly selected challenge and an HMAC, although other authentication methods are also conceivable, in particular using a key pair that is already permanently stored in the input device and the control device.

In addition to the method, the present disclosure also relates to a complete device, in particular a motor vehicle, comprising at least one touch-sensitive, flat input device, for example a touchscreen and/or a touchpad, and a control device, the input device being connected to the control device via a message-based bus connection and having a control unit, and a control device formed by the control unit and the control device is designed to carry out the method according to the disclosure. All statements relating to the method according to the disclosure can be transferred analogously to the complete device, with which the advantages already mentioned can also be obtained. The control unit of the input device is in particular at least supplemented by an encryption unit, via which the encryption is implemented. Specifically, the encryption unit can have a storage device, a pre-calculation module and a linking module for using encryption data elements, which are pre-calculated by the pre-calculation module and stored in the storage device, on a touch dataset currently to be sent via the bus connection. As described, the computing power and the memory requirement of the encryption unit can be balanced against one another via the size of the pre-calculation set in order to satisfy the corresponding application.

To summarize, in some embodiments, when the bus connection is formed by a CAN FD bus, a stream cipher is used to encrypt the touch datasets for which a key stream of a certain length is pre-calculated, and for the synchronization of encryption and decryption a counter is used, which can preferably also be transmitted as part of the messages. In some embodiments, different message types are preferably used for encrypted and unencrypted touch datasets. The pre-calculation ideally already takes place before the security function is accessed. An XOR operation is used as the link operation. In this way, no relevant delays occur, so that, in particular even when the sensitive input information is entered by hand by a user, the touch events can be reliably transmitted and reliable evaluation thereof can take place. It is also possible to switch seamlessly between encryption mode and unencrypted mode. A particularly high level of robustness is achieved due to the use of a counter.

Further advantages and details of the present disclosure will become apparent from the exemplary embodiments described below and with reference to the drawings.

Figure 1:
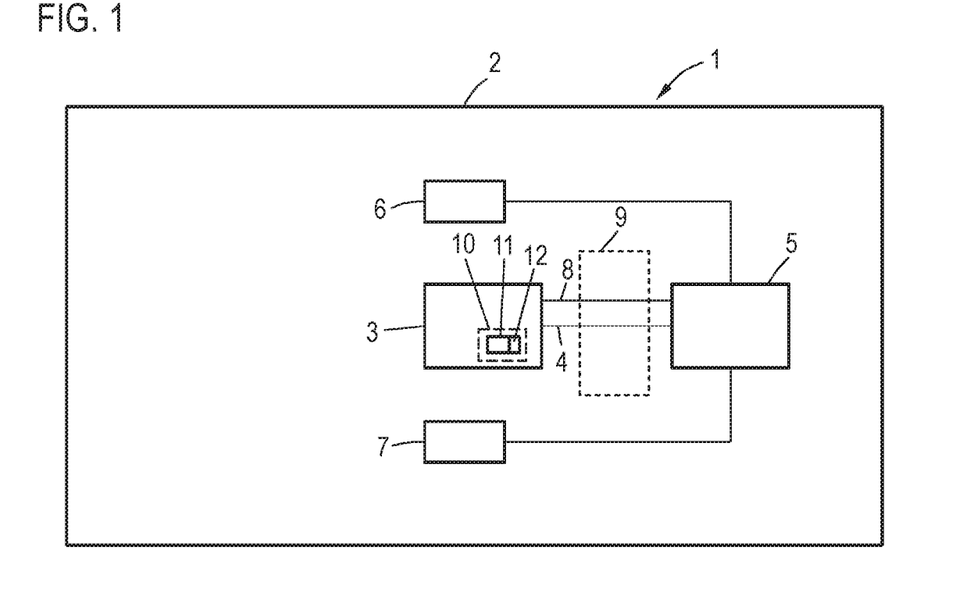
FIG. 1 shows a schematic diagram of a complete device according to some embodiments of the present disclosure.

FIG. 1 shows the schematic sketch of a complete device 1 according to the disclosure, which in the present case is designed as a motor vehicle 2. In addition to a large number of other components and communication connections, which are not shown here for the sake of clarity, the motor vehicle 2 initially includes at least one touch-sensitive, flat input device 3 in the form of a touchscreen, which can be arranged, for example, in the region of a center console of the motor vehicle 2. Alternatively, it can also be a touch surface (touchpad), which is preferably assigned an indicator device, in particular a display. Several such touch input devices 3 can also be provided. The touch input device 3 communicates via a bus connection 4 provided in this example by a CAN FD bus with a motor vehicle control device 5, which can be designed as a control device, in particular an infotainment control device, and comprises at least one component directly connected to the CAN FD bus. Further components of the motor vehicle 2 can also be connected to bus connection 4. Furthermore, display devices 6 and acoustic output device 7 which can be controlled independently of the CAN bus are also present. The input device 3, the control device 5, the display device 6 (for example as an instrument panel or part of an instrument panel) and the acoustic output device 7 are permanently installed in the motor vehicle 2 by the manufacturer.

Since the input device 3 is designed as a touchscreen, and thus also acts as a display device, there is also a video connection 8 to the control device 5. Authentication, as described for example in the subsequently published DE 10 2017 212 809.7, also takes place via this video connection. The bus connection 4 can be used as the return channel of the video connection 8.

In some embodiments, the display device 3 can also be used by aftermarket devices 9 that do not originate from the manufacturer of the motor vehicle 2 and are indicated in FIG. 1 as optional. It is also possible to connect the aftermarket device 9 to the CAN FD bus, so that it can therefore read out messages and can even output messages there. With regard to the video connection 8, a switch is used.

The display device 3, which also has little intrinsic intelligence within the scope of the present disclosure, has a control unit 10 which, together with the control device 5, forms a control means which can carry out the method according to the disclosure. For this purpose, the control unit 10 has, in particular, an encryption unit 11 with a storage device 12, and the encryption unit 11, not shown in more detail here, has a pre-calculation module and a component or a circuit section in order to carry out a linking operation for encryption on the basis of a pre-calculated encryption data element stored in the storage device. In order to implement the encryption, the control device 5 has corresponding functional units which can be implemented by various specific components and are not shown for the sake of clarity.

With regard to the method according to the disclosure, the touch input device 3 can ultimately be operated in two operating modes, namely an encryption operating mode and a non-encrypted or unencrypted operating mode. In the unencrypted operating mode, touch events are output as touch datasets, each of which contains touch coordinates for a finger, output in unencrypted form by means of corresponding messages via the bus connection 4. In the encryption mode, the touch datasets are first encrypted by the linking operation before they are output via the bus connection 4 as corresponding messages containing encrypted touch datasets.

Figure 2:
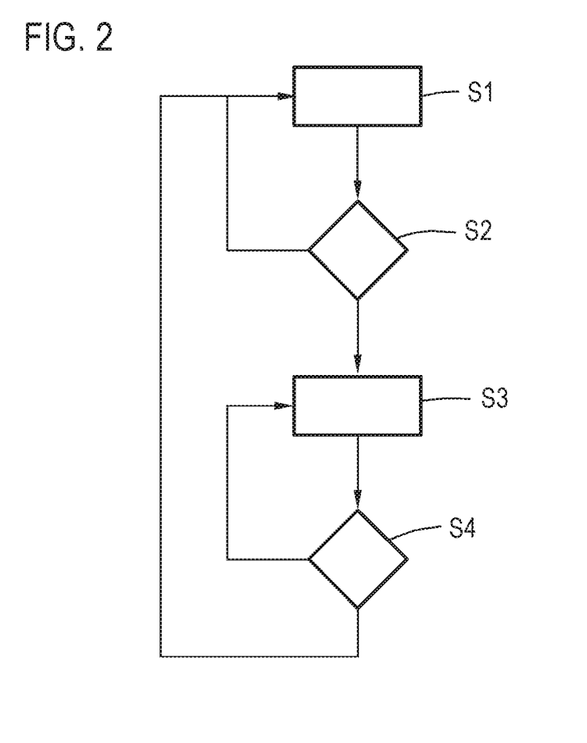
FIG. 2 shows a basic flow diagram of the method according to some embodiments of the present disclosure.

FIG. 2 shows a basic flow diagram of essential steps of the method according to the disclosure. In a step S1, the input device is operated in the unencrypted mode, which means that the touch datasets containing the respective coordinates for each finger are transmitted unencrypted via the bus connection 4, in particular to the control device 5, but possibly also to the aftermarket device 9, where they are evaluated appropriately to determine associated input information for an application program. In this case, a handwritten input is also possible, in particular via the touch input device 3.

In some embodiments, the input device 3 is started in the unencrypted mode after a reset, which also applies to the control device 5 since this is a basic state, so that different operating modes can be avoided. In order to further support this, when the input device 3 or the control device 5 is reset, a switch back to the unencrypted mode takes place via authenticated messages, or the other communication partner is reset in order to ensure that both communication partners are again operated in the unencrypted mode.

In a step S2, the control device 5 checks whether a security function of an application program requesting sensitive input information is accessed. If this is not the case, the process continues with step S1 as usual and unencrypted touch datasets continue to be transmitted. However, if a security function is accessed, for example if it has been marked in a predetermined manner, and for example if sensitive input information such as a credit card number is to be queried, both the input device 3 and the control device 5 are switched to the encryption mode in a step S3 and the touch datasets are transmitted encrypted to the control device 5, are accordingly decrypted there and are supplied for evaluation. The switchover to the encryption mode is carried out by a corresponding switchover message from the control device 5 to the input device 3 via the bus connection 4, which can react with a corresponding confirmation message as soon as the switchover has taken place. It will be noted, as will be explained in the following with regard to detailed exemplary embodiments, that the encryption process of step S3 can already have been prepared by pre-calculating encryption data elements.

In a step S4, it is checked whether the input of the sensitive input information has been completed, and consequently the security-critical input has ended. If this is not the case, encryption continues in step S3, otherwise the system switches back to unencrypted mode, cf. step S1, again using corresponding switchover messages, but in this case another switchover message that also uses an authentication method.

In some embodiments, in the control device 5, errors relating to encryption (as well as any other errors) are constantly monitored. If authentication fails it is not possible to switch over to the encryption mode, if the encryption fails or something similar happens at least one measure can be taken, in the present case in particular warning information is sent to a user using output device that cannot be under the control of an aftermarket device 9. In the present example, this can be the display device 6 and/or the acoustic output device 7. Further sources of error information can be the video authentication of the video connection 8 and information from an IDS (intrusion detection system).

Figure 3:
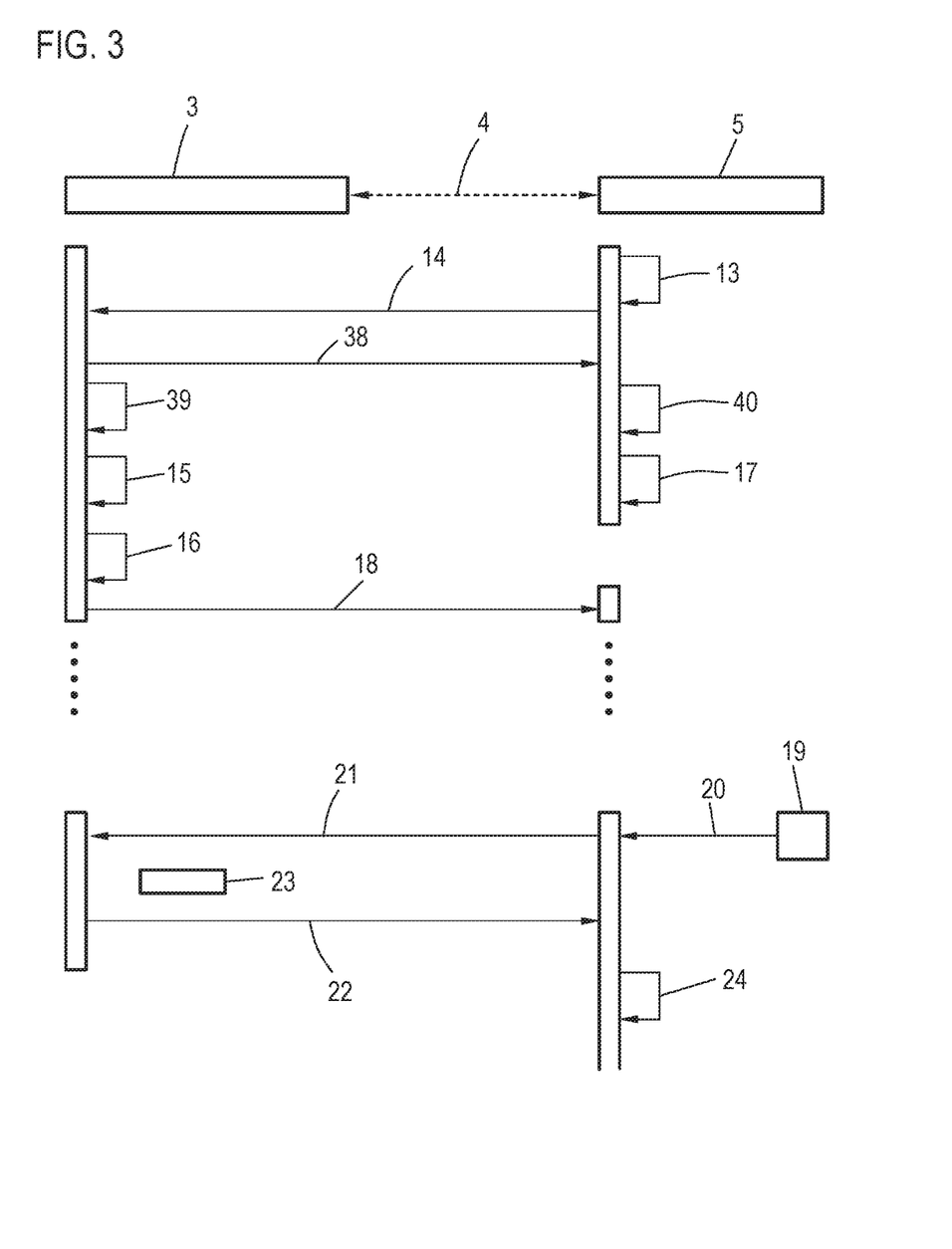
FIG. 3 shows a flow diagram explaining an initialization phase according to some embodiments of the present disclosure.

FIG. 3 shows the processes in an initialization phase in more detail in an exemplary embodiment of the method according to the disclosure. In this case, encryption data elements of a stream cipher to be used here, i.e. a key stream, are to be pre-calculated and stored in the storage device 12, while for example no large amounts or no amounts of data to be encrypted are to be expected from the input device 3. In the exemplary embodiments shown here a key of a symmetrical key pair is stored both in the control device 5 and in the input device 3, which key can be device-specific and can be used for mutual authentication.

The domains of the input device 3 and the control device 5 are indicated in each case in the upper area of FIG. 3 (as well as in the following figures).

According to the arrow 13, a nonce is generated in a first step by the control device 5 as session information on the control device side, which is transmitted to the input device 3 in an initialization message according to the arrow 14. In the present case, the input device 3 itself cannot generate a nonce, so that a counter reading of a monotonic counter is used as session information on the input device side and is transmitted back to the control device 5 in a response message in accordance with arrow 38.

In some embodiments, to work with the nonce of the control device 5, the input device 3 can also be equipped with sufficient intrinsic intelligence, for example a random number generator to generate a nonce itself. Then other generally known authentication processes can also be used.

According to the arrows 39 and 40, the nonce and the counter reading of the monotone counter are then used to determine the session key.

According to the arrow 15, at least the session key is initially used to generate an HMAC (keyed-hash message authentication code) as a signature for the authentication. Even if the HMAC is not sent immediately, this is advisable because the corresponding computing power is not required at a later point in time.

According to the arrow 16, a certain number of encryption data elements of a key stream are then calculated as a pre-calculation set of encryption data elements, preferably also using the key, the nonce and possibly the start counter reading, and the corresponding decryption data elements according to the arrow 17 can possibly already be pre-calculated in a separate key stream in the control device 5. Since the XOR operation which is particularly easy to implement is used as a linking operation in the present exemplary embodiments, the encryption data element and the decryption data element correspond.

According to the arrow 18, a confirmation message can then optionally be sent from the input device 3 to the control device 5 which, likewise optionally, can already contain the HMAC ("nonce ready"). The initialization is thus complete.

At a later point in time, the application program 19 accesses a security function, cf. arrow 20, which triggers the transmission of a switchover message according to the arrow 21 in the control device 5 according to step S2. The control unit 10 switches over to the encryption mode and this is confirmed according to a confirmation message (arrow 22), which may preferably contain the HMAC, in particular if the confirmation message according to the arrow 18 did not. It should be noted that the initialization message according to the arrow 14 and the switchover message according to the arrow 21 can also be sent repeatedly, in particular if corresponding actuation messages according to the arrows 18, 22 are initially absent, in order to make the method more robust. Furthermore, it should be pointed out that between the detection of the accessing of the security function (arrow 22) and the actual switchover, in addition to the confirmation, arrow 22, as indicated by the box 23, messages with unencrypted touch datasets can still occur. Therefore, in the control device 5, as indicated by the arrow 24, it is checked regularly whether the confirmation message 22 has arrived, so that an input instruction for the sensitive input information is only then displayed by the video connection 8 on the input device 3 or an associated display device when encryption is activated. In this case, the HMAC that is also transmitted preferably authenticates the message 22, so that its origin is clear. A further condition that is checked is the successful authentication via the video connection 8.

It should be noted that the initialization phase with the pre-calculation of the key stream does not necessarily have to take place in all exemplary embodiments before the security function is accessed, but this is also conceivable afterwards, and then it may also be expedient to suppress the display of the input instruction until the pre-calculation is completed, and after this the encryption is activated. Furthermore, the corresponding messages (initialization message, switchover message, confirmation message) as well as other messages still to be mentioned can also be secured by further security measures, for example by additional challenge response parameters, if an attack is to be feared.

It should also be noted that the length of the key stream, i.e. the number of encryption data elements in the pre-calculation set, can be selected depending on the size of the storage device 12 or the computing power available in the control unit 10. It follows from this whether a post-calculation or parallel calculation of encryption data elements requiring the least possible delay can or must be carried out. As is customary in the case of stream encryption, a new encryption data element is used for each touch dataset; the resulting configurations with regard to the synchronization of encryption and decryption will be explained in more detail below.

Figure 4:
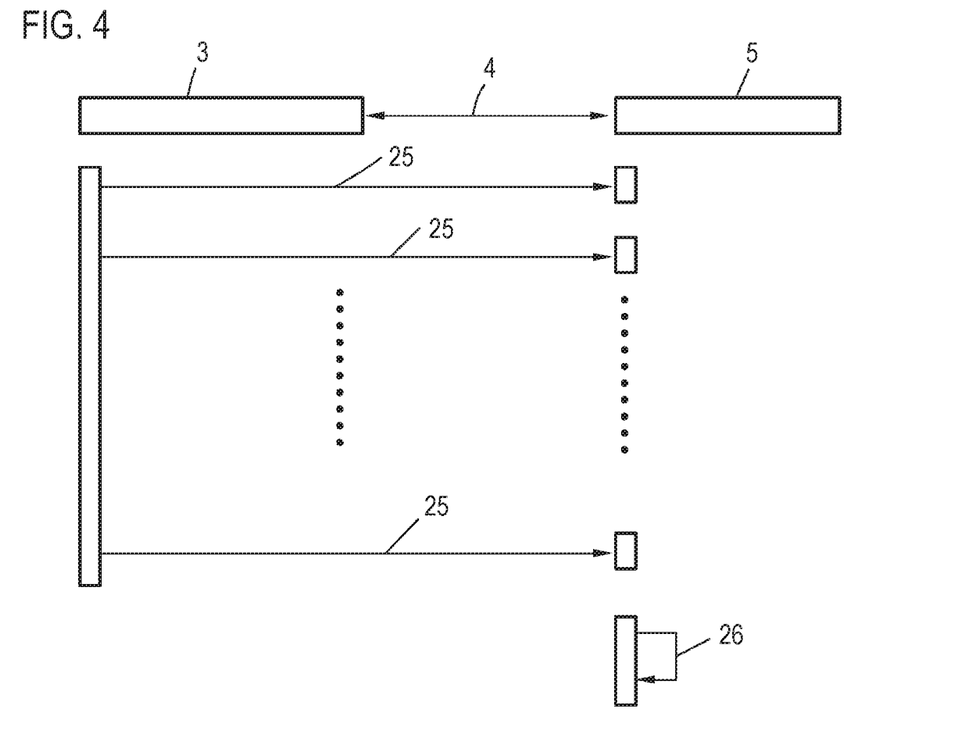
FIG. 4 shows an explanation of a possible segmentation of a signature to be sent according to some embodiments of the present disclosure.

FIG. 4 first shows another approach that can be used in particular in the case of a severely limited message size via the bus connection 4, for example in the case of a CAN bus, in order to transmit the or an HMAC. The HMAC is segmented into N parts, and N messages which also contain an encrypted touch dataset are added, as indicated by the various arrows 25. Only when the HMAC has been completely received does the control device 5 check it according to the arrow 26. For example, when using a CAN bus instead of a CAN FD bus, such a variant can be considered. If there are not enough touch events, blank messages without a touch dataset can be used to complete the HMAC. In this way, the message block according to the arrows 25 is signed, which block was previously transmitted and is now signed afterwards.

In the encryption mode, messages with encrypted touch datasets are also generally sent from the input device 3 to the control device 5 via the bus connection 4 in such a way that the sequence is retained, so that the correct decryption data elements are assigned. The encryption on the part of the control unit 10 takes place via a simple XOR operation as a linking operation in real time and the size of the touch dataset, which can be, for example, 4 bytes. A counter is used both by the input device 3 and by the control device 5, which serves to further increase the robustness. The current counter reading of the counter is expediently transmitted within the message if this offers enough space; the control device 5 thus knows which decryption data element is to be used even in the case of lost messages. To further increase the robustness, in particular if the counter reading is not transmitted, the control device 5 can also perform decryption for higher, future counter readings if a decryption fails.

The decryption in the control device 5 is particularly preferably also carried out in real time, in the present example by the XOR operation, which can be implemented using a corresponding decryption unit (compare encryption unit 11).

HMACs transmitted during or with the messages of the encrypted touch datasets or with synchronization messages still to be discussed can also include the counter reading for generating the signature in order to further increase security.

Figure 5:
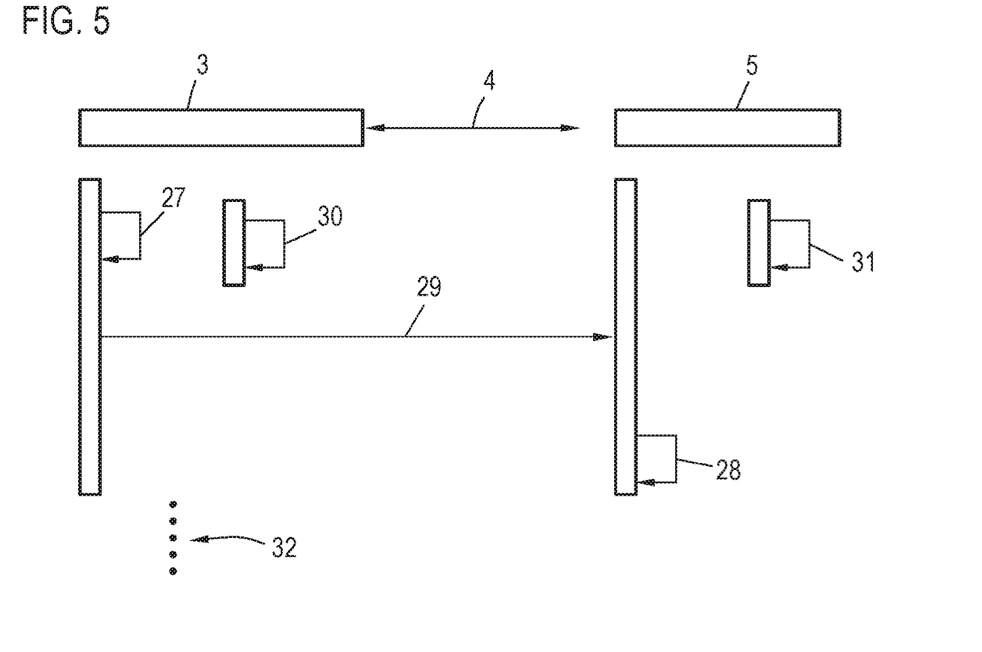
FIG. 5 shows a flow diagram for calculating encryption data elements while using other encryption data elements for encryption according to some embodiments of the present disclosure.

FIG. 5 explains a case in which the number of encryption data elements in the pre-calculation set is chosen to be rather small. For example, the storage device 12 can have smaller dimensions. Then, the input device 3 and the control device 5 first use already pre-calculated encryption data elements or decryption data elements according to the arrows 27 and 28 for encryption or decryption, the transmission of corresponding messages being explained by the arrow 29. In parallel at both communication partners, arrow 30 and arrow 31, the next set of the predetermined number of encryption data elements is pre-calculated and thus prepared. The pre-calculation set already present is used up according to the continuation characters 32, whereupon the pre-calculation set used according to the arrows 30 and 31 is used and a further new pre-calculation set is generated in parallel. The control unit 10 then requires a greater computing power, but less storage space in the storage device 12.

In some embodiments, with regard to the counter, messages with encrypted touch datasets are immediately recognizable by the control device 5. For this purpose, a different message type is used for sending the encrypted touch datasets than for sending the unencrypted message datasets. Alternatively, the use of a dedicated encryption bit in the messages is also conceivable.

Figure 6:
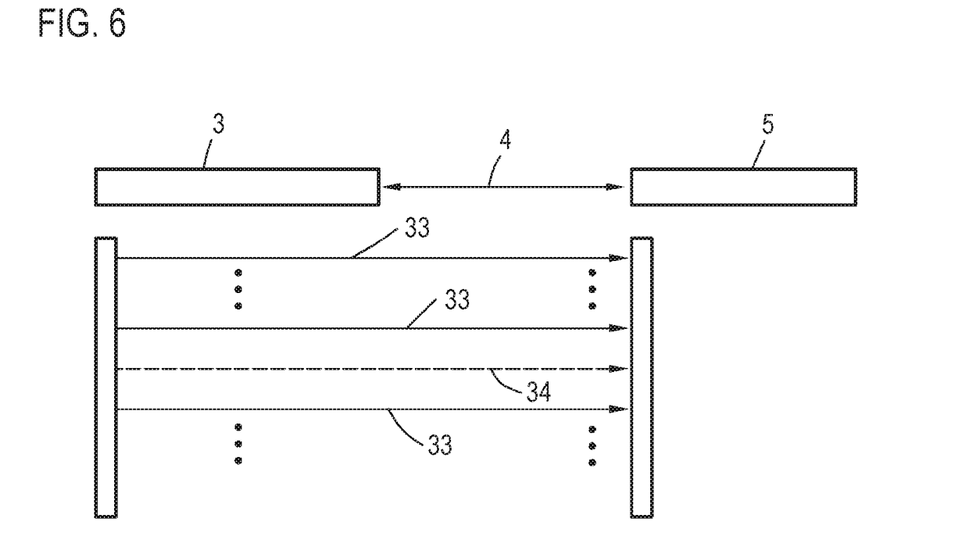
FIG. 6 shows a flow diagram for explaining synchronization messages according to some embodiments of the present disclosure.

FIG. 6 explains the use of synchronization messages. In some embodiments, a synchronization message according to the arrow 34 is sent in each case at specific counter readings between the usual messages containing encrypted touch datasets indicated by arrows 33, in order to secure or restore the conformity of the counter readings. In the case of a counter running cyclically through a range of values, for example, each reset of the counter reading can lead to a synchronization message; it is also conceivable to send synchronization messages each time a pre-calculation set of encryption data elements has been used up.

Figure 7:
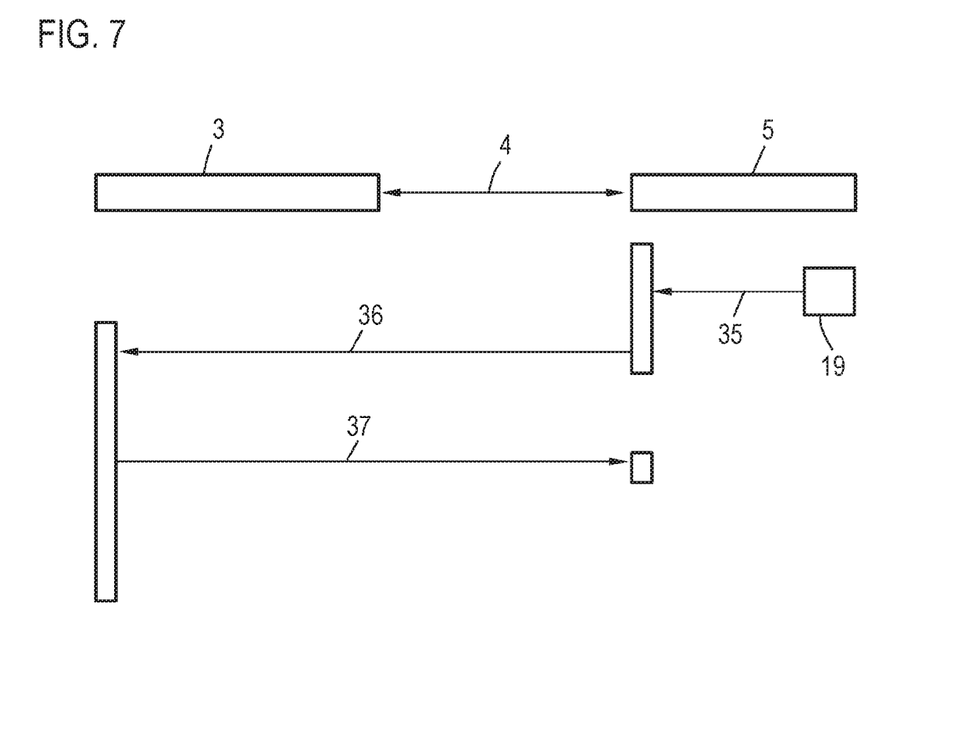
FIG. 7 shows a flow diagram to explain the termination of the encryption mode according to some embodiments of the present disclosure.

Finally, FIG. 7 explains the termination of the encryption mode. If the application program 19 receives the information according to the arrow 35 that the input of the sensitive input information has been completed, the control device 5 generates a switchover signal according to the arrow 36 and sends it to the input device 3. The changeover signal according to the arrow 36 differs from the changeover signal according to the arrow 21 (cf. FIG. 3). The encryption is then deactivated in the input device 3 and a corresponding confirmation signal according to the arrow 37 is transmitted back. The confirmation signal 37 in turn sets a signature, for example the possibly current HMAC, for authentication. As has already been explained with reference to FIG. 3, it is also expedient here that the HMAC was preferably pre-calculated in the initialization phase in order to promote the quickest possible switchover.

It should also be noted that the session key, which is present as a nonce, can be newly selected for each encryption phase. The deactivation of the encryption mode shown here can then be followed by an initialization phase, as described with regard to FIG. 3. It is particularly preferred if such a new initialization phase immediately follows the deactivation of the encryption phase. For example, as soon as the confirmation signal according to the arrow 37 arrives, the control device 5 can generate a new nonce according to the arrow 13.

The invention claimed is:

1. A method for operating a touch-sensitive and flat input device of a complete device, wherein the input device is connected via a bus connection to a control device of the complete device and messages comprising touch datasets describing touch events are transmitted from the input device to the control device, the method comprising:
   evaluating the messages for sensitive input information for an application program implemented by the control device;
   pre-calculating encryption data elements as a key stream for encryption of the touch datasets, different pre-calculated encryption data elements being used for each of the touch datasets;
   holding the pre-calculated encryption data elements in the input device until the pre-calculated encryption data elements are used for the encryption;
   determining decryption data elements for decryption based on shared information of the input device and the control device;
   encrypting the touch datasets based on the pre-calculated encryption data elements when a security function of the application program in the control device queries the sensitive input information;
   transmitting the encrypted touch datasets via the bus connection from the input device to the control device;
   outputting, via an output device, a warning when an error in the encryption is detected by the control device during the decryption, wherein the output device is independent of the input device and cannot be addressed by an aftermarket device; and
   terminating the transmission of the encrypted touch datasets when the sensitive input information is completed.

2. The method according to claim 1, further comprising: connecting a touchpad and/or a touchscreen to the control device of a motor vehicle.

3. The method according to claim 1, further comprising: transmitting a switchover message from the control device to the input device as a function of the sensitive input information of the application program to switch to the encrypted touch datasets and to switch back to non-encrypted touch datasets.

4. The method according to claim 1, further comprising: identifying messages comprising the encrypted touch datasets by a set encryption bit.

5. The method according to claim 1, further comprising: transmitting messages comprising the encrypted touch datasets and messages comprising non-encrypted touch datasets with different message types.

6. The method according to claim 1, further comprising: encrypting and/or decrypting the touch datasets by a linking operation.

7. The method according to claim 6, further comprising: carrying out the linking operation in real time.

8. The method according to claim 6, further comprising:
carrying out the linking operation to maintain sizes of the touch datasets.

9. The method according to claim 6, further comprising:
carrying out the linking operation using an XOR operation.

10. The method according to claim 1, further comprising:
assigning the decryption data element to the encrypted touch datasets by using a counter, the counter being used both by the input device and the control device; and
transmitting the counter from the input device to the control device as part of the messages.

11. The method according to claim 10, further comprising:
transmitting a synchronization message from the input device to the control device to synchronize the counter with a counter reading.

12. The method according to claim 11, further comprising:
decrypting, by the control device, a second counter reading of the counter if the decryption fails.

13. The method according to claim 1, further comprising:
encrypting the touch datasets using a predetermined asymmetrical or symmetrical key pair, wherein the key pair is stored in the input device and in the control device.

14. The method according to claim 13, further comprising:
encrypting the touch datasets using a session key negotiated for the encryption or an activity period determined by the key pair.

15. The method according to claim 1, further comprising:
exchanging at least part of the messages using an authentication method based on the shared information between the input device and the control device.

16. The method according to claim 15, further comprising:
transmitting at least partially, in the messages, a signature created by the input device.

17. The method according to claim 1, further comprising:
implementing a handwritten input at the touch events; and
incorporating touch coordinates of a finger in the touch datasets.

18. The method according to claim 1, further comprising:
using an aftermarket device not originating from a manufacturer of the complete device via the bus connection.

19. The method according to claim 1, further comprising:
using a CAN (Controller Area Network) connection or a CAN FD (flexible data-rate) connection as the bus connection.

20. A motor vehicle, comprising:
a control device configured to evaluate messages for sensitive input information for an application program implemented by the control device;
a touch-sensitive and flat input device, comprising a control unit, wherein:
the input device is connected to the control device via a message-based bus connection, and
the input device is configured to:
transmit, to the control device, the messages comprising touch datasets describing touch events, wherein the touch datasets are encrypted when a security function of the application program in the control device queries the sensitive input information;
pre-calculate encryption data elements as a key stream for encryption of the touch datasets, different encryption data elements being used for each of the encrypted touch datasets; and
store the pre-calculated encryption data elements until the pre-calculated encryption data elements are used for encryption; and
an output device, independent of the input device, wherein the output device cannot be addressed by an aftermarket device, and wherein the output device is configured to output a warning when an error in the encryption is detected by the control device during the decryption.

* * * * *